(12) United States Patent
Zmolek

(10) Patent No.: US 7,536,437 B2
(45) Date of Patent: May 19, 2009

(54) PRESENCE TRACKING AND NAME SPACE INTERCONNECTION TECHNIQUES

(75) Inventor: Andrew Charles Zmolek, Highlands Ranch, CO (US)

(73) Assignee: Avaya Inc., Basking Ridge, NJ (US)

( * ) Notice: Subject to any disclaimer, the term of this patent is extended or adjusted under 35 U.S.C. 154(b) by 714 days.

(21) Appl. No.: 10/367,260

(22) Filed: Feb. 14, 2003

(65) Prior Publication Data

US 2003/0154293 A1 Aug. 14, 2003

Related U.S. Application Data

(60) Provisional application No. 60/357,240, filed on Feb. 14, 2002, provisional application No. 60/442,329, filed on Jan. 23, 2003.

(51) Int. Cl.
*G06F 15/16* (2006.01)
*H04W 24/00* (2009.01)

(52) U.S. Cl. .................. 709/206; 709/204; 455/456.1

(58) Field of Classification Search ................ 709/206, 709/219, 238, 245, 249, 202, 203, 204; 455/456.1
See application file for complete search history.

(56) References Cited

U.S. PATENT DOCUMENTS

| | | | |
|---|---|---|---|
| 4,817,130 A | 3/1989 | Frimmel, Jr. | |
| 4,941,168 A | 7/1990 | Kelly, Jr. | |
| 5,003,577 A | 3/1991 | Ertz et al. | |
| 5,185,782 A | 2/1993 | Srinivasan | |
| 5,206,903 A | 4/1993 | Kohler et al. | |
| 5,329,578 A | 7/1994 | Brennan et al. | |
| 5,341,414 A | 8/1994 | Popke | |
| 5,371,534 A | 12/1994 | Dagdeviren et al. | |
| 5,410,343 A | 4/1995 | Coddington et al. | |
| 5,430,792 A | 7/1995 | Jesurum et al. | |
| 5,434,908 A | 7/1995 | Klein | |
| 5,511,112 A | 4/1996 | Szlam | |
| 5,555,376 A | 9/1996 | Theimer et al. | |
| 5,712,902 A | 1/1998 | Florence et al. | |
| 5,742,763 A | 4/1998 | Jones | ...................... 395/200.3 |

(Continued)

FOREIGN PATENT DOCUMENTS

EP 0 886 416 12/1998

(Continued)

OTHER PUBLICATIONS

U.S. Appl. No. 09/619,276, filed Jul. 19, 2000, Brunson.

(Continued)

*Primary Examiner*—Ario Etienne
*Assistant Examiner*—Philip J Chea
(74) *Attorney, Agent, or Firm*—Sheridan Ross P.C.

(57) ABSTRACT

The present invention is directed to a presence and availability system including:

(a) an input (e.g., an interface) operable to receive an agent report from a context sensing agent in a host entity associated with a person, the agent report comprising presence information and the person having an address in an associated name space;

(b) a tracking agent 154 operable to tag at least some of the presence information with at least one classification tag; and (c) a policy agent 158 operable to determine presence information to be provided to a requestor based on the at least one classification tag.

15 Claims, 4 Drawing Sheets

U.S. PATENT DOCUMENTS

| | | | |
|---|---|---|---|
| 5,802,510 A | 9/1998 | Jones | 707/2 |
| 5,819,084 A | 10/1998 | Shapiro et al. | 395/610 |
| 5,826,039 A | 10/1998 | Jones | 395/200.36 |
| 5,828,747 A | 10/1998 | Fisher et al. | |
| 5,864,874 A | 1/1999 | Shapiro | 707/201 |
| 5,905,793 A | 5/1999 | Flockhart et al. | |
| 5,982,873 A | 11/1999 | Flockhart et al. | |
| 6,018,655 A * | 1/2000 | Bartle et al. | 455/421 |
| 6,031,896 A | 2/2000 | Gardell et al. | 379/88.17 |
| 6,038,296 A | 3/2000 | Brunson et al. | 379/100.11 |
| 6,046,762 A | 4/2000 | Sonesh et al. | |
| 6,088,441 A | 7/2000 | Flockhart et al. | |
| 6,094,681 A | 7/2000 | Shaffer et al. | |
| 6,128,304 A | 10/2000 | Gardell et al. | 370/401 |
| 6,130,937 A | 10/2000 | Fotta | |
| 6,144,644 A | 11/2000 | Bajzath et al. | |
| 6,163,607 A | 12/2000 | Bogart et al. | |
| 6,169,795 B1 | 1/2001 | Dunn et al. | |
| 6,173,053 B1 | 1/2001 | Bogart et al. | |
| 6,185,603 B1 | 2/2001 | Henderson et al. | 709/206 |
| 6,188,756 B1 * | 2/2001 | Mashinsky | 379/207.04 |
| 6,192,122 B1 | 2/2001 | Flockhart et al. | |
| 6,226,360 B1 | 5/2001 | Goldberg et al. | |
| 6,272,319 B1 | 8/2001 | Narusawa | |
| 6,298,062 B1 | 10/2001 | Gardell et al. | 370/401 |
| 6,307,931 B1 | 10/2001 | Vaudreuil | 379/229 |
| 6,310,947 B1 | 10/2001 | Polcyn | |
| 6,311,231 B1 | 10/2001 | Bateman et al. | |
| 6,317,593 B1 | 11/2001 | Vossler | |
| 6,330,243 B1 | 12/2001 | Strandberg | |
| 6,330,317 B1 | 12/2001 | Garfinkel | |
| 6,332,081 B1 | 12/2001 | Do | 455/461 |
| 6,360,222 B1 | 3/2002 | Quinn | 707/100 |
| 6,408,177 B1 | 6/2002 | Parikh et al. | |
| 6,411,682 B1 | 6/2002 | Fuller et al. | 379/67.1 |
| 6,430,271 B1 | 8/2002 | DeJesus et al. | |
| 6,430,602 B1 | 8/2002 | Kay et al. | |
| 6,449,260 B1 | 9/2002 | Sassin et al. | |
| 6,456,711 B1 | 9/2002 | Cheung et al. | |
| 6,463,299 B1 | 10/2002 | Macor | |
| 6,477,373 B1 | 11/2002 | Rappaport et al. | |
| 6,477,374 B1 | 11/2002 | Shaffer et al. | |
| 6,480,484 B2 | 11/2002 | Morton | |
| 6,535,600 B1 | 3/2003 | Fisher et al. | |
| 6,546,097 B1 | 4/2003 | Peltz | |
| 6,549,612 B2 | 4/2003 | Gifford et al. | |
| 6,614,783 B1 | 9/2003 | Sonesh et al. | |
| 6,636,587 B1 * | 10/2003 | Nagai et al. | 379/88.14 |
| 6,665,534 B1 | 12/2003 | Conklin et al. | |
| 6,741,586 B1 | 5/2004 | Schuster et al. | |
| 6,750,897 B1 | 6/2004 | Moshrefi et al. | |
| 6,788,773 B1 | 9/2004 | Fotta | |
| 6,789,120 B1 | 9/2004 | Lee et al. | |
| 6,868,395 B1 | 3/2005 | Szlam et al. | |
| 6,879,677 B2 | 4/2005 | Trandal et al. | |
| 6,879,828 B2 | 4/2005 | Virtanen et al. | |
| 6,891,933 B2 | 5/2005 | Kumamoto | |
| 6,925,166 B1 | 8/2005 | Chan | |
| 6,968,179 B1 | 11/2005 | De Vries | |
| 6,988,126 B2 | 1/2006 | Wilcock et al. | |
| 6,999,731 B2 | 2/2006 | Cronin | |
| 7,027,586 B2 | 4/2006 | Bushey et al. | |
| 7,054,939 B2 | 5/2006 | Koch et al. | |
| 7,068,762 B2 | 6/2006 | Skladman et al. | |
| 7,080,321 B2 | 7/2006 | Aleksander et al. | |
| 7,092,370 B2 | 8/2006 | Jiang et al. | |
| 7,158,630 B2 | 1/2007 | Fotta et al. | |
| 7,215,760 B2 | 5/2007 | Lenard | |
| 7,248,677 B2 | 7/2007 | Randall et al. | |
| 7,269,247 B2 * | 9/2007 | Mashinsky | 379/88.14 |
| 7,398,061 B2 | 7/2008 | Mousseau | |
| 2001/0006893 A1 | 7/2001 | Yoshioka | |
| 2001/0019816 A1 | 9/2001 | Kumar | 433/172 |
| 2001/0042126 A1 | 11/2001 | Wong et al. | 709/229 |
| 2001/0053214 A1 | 12/2001 | Kleinoder et al. | 379/207.04 |
| 2001/0054037 A1 | 12/2001 | Shapiro et al. | 707/3 |
| 2002/0019829 A1 | 2/2002 | Shapiro | 707/201 |
| 2002/0021307 A1 | 2/2002 | Glenn et al. | 345/753 |
| 2002/0032040 A1 | 3/2002 | Tsukamoto | |
| 2002/0035594 A1 | 3/2002 | Dreke et al. | 709/203 |
| 2002/0035605 A1 | 3/2002 | McDowell et al. | 709/206 |
| 2002/0052225 A1 | 5/2002 | Davis et al. | |
| 2002/0055350 A1 | 5/2002 | Gupte et al. | |
| 2002/0055975 A1 | 5/2002 | Petrovykh | 709/205 |
| 2002/0065894 A1 | 5/2002 | Dalal et al. | 709/206 |
| 2002/0069081 A1 | 6/2002 | Ingram et al. | |
| 2002/0076010 A1 | 6/2002 | Sahai | 379/88.19 |
| 2002/0076025 A1 | 6/2002 | Liversidge et al. | |
| 2002/0083127 A1 | 6/2002 | Agrawal | 709/203 |
| 2002/0085701 A1 | 7/2002 | Parsons et al. | 379/211.01 |
| 2002/0086672 A1 | 7/2002 | McDowell et al. | 455/432 |
| 2002/0087630 A1 | 7/2002 | Wu | 709/203 |
| 2002/0097856 A1 | 7/2002 | Wullert, II | 379/201.01 |
| 2002/0098831 A1 | 7/2002 | Castell et al. | |
| 2002/0116336 A1 | 8/2002 | Diacakis et al. | 705/51 |
| 2002/0116461 A1 | 8/2002 | Diacakis et al. | 709/204 |
| 2002/0120687 A1 | 8/2002 | Diacakis et al. | 709/204 |
| 2002/0126701 A1 | 9/2002 | Requena | |
| 2002/0147002 A1 * | 10/2002 | Trop et al. | 455/406 |
| 2003/0014491 A1 * | 1/2003 | Horvitz et al. | 709/206 |
| 2003/0018720 A1 | 1/2003 | Chang et al. | |
| 2003/0028621 A1 | 2/2003 | Furlong et al. | 709/219 |
| 2003/0073440 A1 | 4/2003 | Mukherjee et al. | 455/435 |
| 2003/0110228 A1 | 6/2003 | Xu et al. | |
| 2003/0130864 A1 | 7/2003 | Ho et al. | |
| 2003/0195811 A1 | 10/2003 | Hayes et al. | |
| 2004/0010431 A1 | 1/2004 | Thomas et al. | |
| 2004/0120498 A1 | 6/2004 | Sylvain | |
| 2004/0141594 A1 | 7/2004 | Brunson | |
| 2004/0189698 A1 | 9/2004 | Bokish | |
| 2005/0031107 A1 | 2/2005 | Fotta | |
| 2005/0187781 A1 | 8/2005 | Christensen et al. | |
| 2005/0216848 A1 | 9/2005 | Thompson et al. | |
| 2005/0276407 A1 | 12/2005 | Mohler | |
| 2007/0121808 A1 | 5/2007 | Brunson et al. | |
| 2007/0127699 A1 | 6/2007 | Lenard | |

FOREIGN PATENT DOCUMENTS

| | | |
|---|---|---|
| EP | 1261179 | 11/2002 |
| JP | 05-260188 | 10/1993 |
| JP | 9-200813 | 7/1997 |
| JP | H11-046377 | 2/1999 |
| JP | 11-088495 | 3/1999 |
| JP | H11-205837 | 7/1999 |
| JP | 2000-102059 | 4/2000 |
| JP | 2000-312258 | 11/2000 |
| JP | 2001-189774 | 7/2001 |
| JP | 2001-224075 | 8/2001 |
| JP | 2001-251395 | 9/2001 |
| JP | 2001-350782 | 12/2001 |
| JP | 2002-094614 | 3/2002 |
| JP | 2002-101155 | 4/2002 |
| JP | 2002-108794 | 4/2002 |
| JP | 2002-152335 | 5/2002 |
| JP | 2002-176449 | 6/2002 |
| JP | 2003-8655 | 1/2003 |
| JP | 2003-116175 | 4/2003 |
| JP | 2003-517781 | 5/2003 |
| JP | 2004-013303 | 1/2004 |
| WO | WO 00/39964 | 7/2000 |
| WO | WO 00/69140 | 11/2000 |
| WO | WO 01/45368 | 6/2001 |
| WO | WO 01/55915 A1 | 8/2001 |

| | | |
|---|---|---|
| WO | WO 01/69387 | 9/2001 |
| WO | WO 02/30105 | 4/2002 |
| WO | WO 03/025776 | 3/2003 |
| WO | WO 03/085539 | 10/2003 |

OTHER PUBLICATIONS

Richard Grigonis, *Computer Telephony Encyclopedia* (2000) pp. 367-375.

Richard Grigonis, *Computer Telephony Encyclopedia* (2000) pp. 413-430.

Richard Shockey, "ENUM: Phone Numbers Meet the Net" www.cConvergence.com (Jul. 2001) pp. 21-30.

Bill Michael, "The Politics of Naming" www.cConvergence.com (Jul. 2001) pp. 31-35.

The MIT Oxygen Project, Cambridge, MA, Apr. 25-26, 2000.

MIT Project Oxygen, "Oxygen: Pervasive, Human-Centered Computing" MIT Laboratory for Computer Science, MIT Artificial Intelligence Laboratory (May 2002).

Sugano et al.; "Common Presence and Instant Messaging (CPIM) Presence Information Data Format," Network Working Group (Dec. 2002), available at http://www.Ietf.org/internet-drafts/draft-Ietf-impp-cpim-pidf-07.txt, 26 pages.

Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.

Atkins et a.l; "Common Presence and Instant Messaging: Message Format," Network Working Group (Jan. 9, 2003), available at http://www.ietf.org/internet-drafts/draft-ietf-impp-cplm-msgfmt-08.txt, 31 pages.

Rose et al..; "The APEX Presence Service," Network Working Group (Jan. 14, 2002), available at http://www.ietf.org/internet-drafts/draft-ietf-apex-presence-06.txt, 31 pages.

Day et al.; "A Model for Presence and Instant Messaging," Network Working Group (Feb. 2000), available at http://www.ietf.org/rfc/rfc2778.txt?number=2778, 16 pages.

Day et al.; "Instant Messaging/Presence Protocol Requirements," Network Working Group (Feb. 2000), available at http://www.ietf.org/rfc/rfc2779.txt?number=2779, 25 pages.

Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.

Fielding et al.; "Hypertext Transfer Protocol—HTTP/1.1," Network Working Group, Request for Comments 2068 (Jan. 1997), 152 pages.

Berners-Lee et al.; "Uniform Resource Identifiers (URI); Generic Syntax," Network Working Group, Request for Comments 2396 (Aug. 1998), 38 pages.

G. Klyne; "A Syntax for Describing Media Feature Sets," Network Working Group (Mar. 1999), available at http://www.ietf.org/rfc/rfc2533.txt?number=2533, 35 pages.

G. Klyne; "Protocol-independent Content Negotiation Framework," Network Working Group (Sep. 1999), available at http://www.Ietf.org/rfc/rfc2703.txt?number=2703, 19 pages.

Holtman et al.; "Transparent Content Negotiation in HTTP," Network Working Group (Mar. 1998), available at http://www.ietf.org/rfc/rfc2295.txt?number=2295, 55 pages.

Holtman et al.; "HTTP Remote Variant Selection Algorithm—RVSA/1.0," Network Working Group (Mar. 1998), available at http://www.ietf.org/rfc/rfc2296.txt?number=2296, 13 pages.

Dawson et al.; "Vcard MIME Directory Profile," Network Working Group (Sep. 1998), available at http://www.ietf.org/rfc/rfc2426.txt?number=2426, 40 pages.

Andy Zmolek; "SIMPLE and Presence: Enterprise Value Propositions," Avaya presentation, 16 pages, presented Jan. 24, 2002.

Chavez, E., et al.; "Interactive applications of personal situation-aware assistants"; *Computers and Graphics*, Pergamon Press Ltd., Oxford, GB, vol. 23, No. 6, Dec. 1999, pp. 903-915, XP004187839, ISSN: 0097-8493.

Supplementary Partial European Search Report, EP 03 73 9831, dated Aug. 5, 2005.

CC News: Call Center Technology, "FaceTime gives voice, vision to instant messaging", available at http://www.ccnews.com/may2000/depts/cct/cctstory2.htm, 2 pages, Copyright 2000, 1999.

CommWeb.com "Enterprise Customer Interfaces: Application Messaging Via Instant Messaging" (Dec. 9, 2002), available at http://www.commweb.com/article/COM20021209S0001/2, 3 pages.

CosmoCall Universe™, "The Carrier-Grade, All-IP Contact Center Platform for Next Generation Network-Based Services" (2002) 3 pages.

CosmoCall Universe™, "The Next Generation IP Contact Center Platform", available at http://www.cosmocom.com/Productinfo/Product.htm, 18 pages, 1997-2003.

e-Vantage Solutions, "Customer Service Window", available at http://www.evgl.com/dsw.html, 2 pages, 2003.

FaceTime Communications Press Release, "Amica Insurance Selects FaceTime Communications to Provide Instant Messaging-Based Customer Service in Enterprise" (Jun. 25, 2001), available at http://www.factime.com/pr/pr010625.shtm, 2 pages.

FaceTime Communications website, "Customer Services", available at http://www.facetime.com/custsvcs.shtm, 4 pages, 2003.

FaceTime Communications website, "Overview", available at http://www.facetime.com/solutions.shtm, 4 pages,2003.

FaceTime Communications website, "Presence Management", available at http://www.facetime.com/presence.shtm, 3 pages, 2003.

G. Klyne et al., "Instant Messaging using APEX", Network Working Group, Jun. 1, 2001, 19 pages.

Grigonis, Computer Technology Encyclopedia (2000) pp. 342-345, 389-392.

J. Rosenberg et al., "SIP extensions for Instant Messaging", Internet Engineering Task Force, Jul. 18, 2001, 22 pages.

Live2Support, "Features", Available at http://web.archive.org/web/20040206215142/www.live2support.com/features_live_chat.php>, undated, 4 pages.

"MIT Project Oxygen Publications", 2 pages, undated.

Ovisoft Technologies, "Ovisoft Messenger—Call Center Solutions", available at http://www.ofisoft.com/solutioncallcenter.htm, 1 page, 2003.

Pervasive, Human-Centered Computing, MIT Project Oxygen, published by MIT Laboratory for Computer Science (May 2002).

Schulzrinne, H., et al., "The Session Initiation Protocol: Internet-Centric Signaling", IEEE Communications Magazine (Oct. 2000), vol. 38, No. 10, pp. 134-141.

Stephanie Losi, "Instant Messaging for Call Centers Leaves 'Em Smiling" www.CRMDaily.com (Jun. 4, 2001), available at http://www.newsfactor.com/perl/story/10246.html, 3 pages.

Trudy Walsh, "Instant messaging boosts service at Texas call center" GCN (Nov. 2001), available at http://www.gcn.com/cgi-bin/udt/im.display.printable?client.id=state2&story.id=16765, 2 pages.

Venus Valley, "Live chat for your website", Available at http://www.pppindia.com/vvchat/shots.htm>, Venus Valley Live Support, 2003, 2 pages.

WiredRed News Release, "WiredRed to Provide Secure Instant Messaging for Eight New Call Center Customers", available at http://www.wiredred.com/news_release_callctr.html, 2 pages, Sep. 28, 2002.

XML-NS Tim Bray et al., "Namespaces in XML", W3C recommendation: xml-names, Jan. 14, 1999, 12 pages.

"Phone Mail Override for Incoming Calls", IBM Technical Disclosure Bullitin, vol. 37, No. 11, Nov. 1994.

Official Action for Canadian Patent Application No. 2,472,953, mailed Mar. 7, 2008.

Examiner's Office Letter (including translation) for Japanese Patent Application No. 2003-568432, mailed Dec. 3, 2007.

Background of the Invention of the above-captioned application (previously provided).

Official Action for Canadian Patent Application No. 2,472,953, mailed Jan. 9, 2009.

Examiner's Office Letter (including translation) for Japanese Patent Application No. 2003-568432, mailed Dec. 22, 2008.

\* cited by examiner

PRESENCE TRACKING AND NAME SPACE INTERCONNECTION TECHNIQUES

CROSS REFERENCE TO RELATED APPLICATIONS

The present application claims priority from U.S. Provisional Patent Application Ser. Nos. 60/357,240, filed Feb. 14, 2002, and 60/442,329 filed Jan. 23,2003, both of the same title and both to Zmolek, each of which is incorporated herein by this reference in their entireties.

FIELD OF THE INVENTION

The present invention is directed generally to telephony networks and specifically to presence-aware telephony networks.

BACKGROUND OF THE INVENTION

The convergence of the mobile telephone network, the static telephone network, and the IP network provides a myriad of communication options for users. If one seeks to contact another individual, he or she may do so by electronic mail or e-mail, instant messaging, wired or wireless telephone, personal computer, pager, personal digital assistant or PDA, and Unified Messaging or UM systems, to name but a few. With so many options, it is difficult, if not impossible, to determine which option at a given point in time will provide the caller with the highest likelihood of contacting the desired individual or callee. Trial and error and guesswork are the typical techniques used to contact the callee, which more often than not leads to a waste of time and frustration on the part of the caller.

Various attempts have been made to provide a presence and availability system that can track temporally a person's presence and availability and thereby provide a contactor with the highest likelihood of contacting the person. This is typically effected by collecting information from communication devices associated with the person. Such systems can further permit the person to define their availability to be contacted generally and/or to defined groups of contactors and how that contactor or group of contactors may contact them. This can be effected by allowing the person to configure the contactor's access control settings. As will be appreciated, contactors can view the information regarding the availability of contactees and use that information to determine whether or not and how to initiate or continue communications.

Recently, the Session Initiation Protocol or SIP (which is a simple signaling/application layer protocol for data network multimedia conferencing and telephony) has been developed to facilitate media-independent signaling and the implementation of presence and availability systems. Although other protocols may be equally supportive of presence concepts, SIP provides an illustrative basis for the present invention. In SIP, end systems and proxy servers can provide services such as call forwarding, contactee and contactor number delivery (where numbers can be any naming scheme such as a conventional URL format), personal mobility (the ability to reach a contactee under a single, location-independent address even when the contactee changes terminals), terminal-type negotiation and selection (e.g., a contactor can be given a choice on how to reach the contactee), terminal capability negotiation, caller and callee authentication, blind and supervised call transfer, and invitations to multiparty conferences.

To provide these varied services, SIP uses a relatively simple message system. Contacts begin via an "INVITE" message (with the contactor's codec preferences) and an "OK" message (with the contactee's codec preferences). Various software entities may participate, namely registrars which maintain a map of the addresses of a given user at the current time, proxies which perform call routing, some session management, user authentication, redirect functions, and routing to media gateways, redirect servers which perform a subset of forwarding functions, and SIP location servers which maintain user profiles and provide subscriber registration. "Registration" is a mechanism whereby a user's communication device registers with the network each time he or she comes online or needs to charge existing registration and individual profiles are maintained that specify information for routing contacts based on a number of different criteria.

Notwithstanding the above, conventional presence and availability systems are limited in scope. Conventional presence and availability systems have been tied to a small subset of Universal Resource Identifier (URI) (or Universal Resource Locator (URL)) name spaces and few non-URI or non-URL name spaces, particularly with respect to object identification systems not associated with an individual. As used herein, a "name space" refers to a numeric, alphabetical, or alpha-numeric-based system or address that is controlled by an entity or standards so as to maintain the attribute of identifier uniqueness within a predefined set of identifiers. Examples of name spaces not supported by current presence systems include Universal Product Codes or UPC 's, GPS locaton data, ISBN codes, and proprietary messaging handles. An address in a name space may be associated with one or more communication devices or objects. Interfacing presence and availability systems to these other communications and identification systems is important in view of the increasing degree of convergence of conventional telephony, the Internet, and other systems. Moreover, conventional presence and availability systems are not inter-networked with other external presence and availability systems and/or other systems collecting useful presence-related information, such as the subscriber physical location information generated by wireless networks. Although some related work is being done in the Internet Engineering Task Force or IETF on open presence systems using work done in the SIMPLE, IMPP and SIP working groups, the current proposals address only the basic frameworks of a presence service and not name space inter-working beyond E.164 systems. Existing practice and standards still lack many algorithms and techniques important to meeting the needs of working, interoperable presence and availability systems.

SUMMARY OF THE INVENTION

These and other needs are addressed by the various embodiments and configurations of the present invention. The present invention is directed generally to an intelligent presence and availability system and to a methodology for mapping an address in a name space for communication systems or inanimate objects against addresses in the same or other name spaces to provide operational options to a requestor.

In a first embodiment, a method for ascertaining availability of a person having an associated name space is provided that includes the steps of:

(a) receiving an agent report from a context sensing agent in a host entity associated with the person, the agent report comprising presence information; and (b) tagging some or all of the presence information with at least one classification tag. "Presence information" generally refers to contextual tags or other contextual data or metadata that identifies and/or is otherwise associated with one or more of availability information, location information, profile information, or user-defined attributes related to a tracked address and/or its associated identity. Relevant metadata includes, without limitation, agent identification information (including without limitation identifiers, addresses, and authentication tokens) respecting the agent providing the presence information, tags, time stamps such as associated with an agent report or a tag contained therein, and expiration time provided by the agent for the tags or other types of contextual data. "Contextual tags" or "classification tags" refer to discrete attribute(s) associated with or relating to a tracked address or identity. These attributes include, without limitation, availability information, location information, profile information, and user defined attributes. A "tag" refers to one or more characters, attached to a set of information or meta-information, that contains information about the set, such as its identification.

The address contained in an associated name space is typically a unique identity. Examples of such addresses include address of record (or primary contact address) and device or system-specific contact addresses.

The agent report typically includes a unique identifier associated with the context sensing agent and Internet Protocol or IP address of that agent, a telephone number, instant messaging handle, SIP address, or other address associated with the tracked identity, one or more time stamps associated with the report and expiration time, and information identifying the event (such as classification tags). The agent report can further include an authentication token, information regarding a spatial location of the tracked identity, and the like.

The tracked identity can be associated with a specific person or group, a service provider or group of service providers, a product provider or group of product providers, or specific device(s)/system(s) or group of devices or systems including an Internet Protocol or IP hardphone, IP softphone, Personal Digital Assistant or PDA, wired telephone, wireless telephone and associated system, pager, facsimile machine, telephony switch, server, instant messaging system modem, Global Positioning System or GPS enabled device, wireless scanner/reader in use by that user, and the like.

One or more classification tags maybe associated with the presence information. The classification tag is typically indicative of one or more of the following: the media supported by the tracked identity, the type of tracked identity, the spatial or geopolitical location of the tracked identity, the operating mode of the tracked identity, the event triggering the agent report, the capabilities of the tracked identity, media type, minimum contactable priority, authentication required, or grouping class. As will be appreciated, some of these items, such as the location of the tracked identity and the event triggering the agent report can alternatively or additionally be included as data in context data formatted separately (after the contact address) in the agent report.

To provide user flexibility and control, the contents of the agent report can be viewed and manipulated by the person or contactee before transmission to the sensing agent.

The method can provide more accurate representations of presence and availability than current systems. The method can include the step of determining a probability of the person being available and/or unavailable at the tracked identity. In one configuration, the probability is determined by mapping tracking rules associated with the associated name space against the presence information to provide availability intelligence. "Availability intelligence" refers to processed (e.g., compiled, cross-referenced, and/or filtered) presence information or meta-information. Policy rules associated with the person's or contactee's name space can then be mapped against the availability intelligence to determine what availability intelligence is to be provided to a requester.

The probability can be altered to reflect information received from other context sensing agents in other host entities. By way of example, when two host entities are in spatial proximity to one another information received from their respective sensing agents can indicate whether the person is in proximity to both entities.

In a second embodiment, a method is provided for presenting presence information associated with a contactee to a contactor. The method includes the steps of:

(a) determining a first degree of availability (or contactability) on a first communication device or system, wherein the first communication device has a first mode of communication;

(b) determining a second degree of availability (or contactability) on a second communication device or system, wherein the second communication device has a second mode of communication and the first and second modes of communication are different; and (c) presenting to the contactor the first and second modes of communication and the first and second (or more) degrees of availability, respectively, and the option to select between the first and second (or more) modes of communication.

Examples of differing first and second communication modes include the first mode of communication being a live voice communication and the second mode of communication being one or more of voice mail, email, instant messaging, a chat session, short messaging system or SMS, video, and facsimile.

In a third embodiment, a method for providing information regarding an inanimate object having an address in a name space presented thereon is provided. The method includes the steps of:

(a) receiving the address and associated name space on the inanimate object;

(b) mapping part or all of the address to one or more contact addresses;

(c) identifying an appropriate contact address corresponding to the service or function desired; and (d) initiating a contact to the identified address.

The name space can be the set of phone numbers, Universal Product Codes, International Standard Book Number(s) or ISBN code(s), part numbers, email address(es) or Web address(es), and the like. The listing of contact addresses can be made in muliple name spaces. It can further include an embedded presence token.

The address and associated name space can be acquired by any suitable technique, including optical, magnetic, electrical, electromagnetic, and/or magneto-optical techniques.

The identified address can be presented in the form of a Uniform Resource Locator (also known as a Uniform Resource Indicator). The URL or URI can be associated with a different operational option available to a requestor or with a presence server.

The various embodiments of the present invention can provide a number of advantages over the prior art.

First, the present invention can provide a universal means of expressing identity for a person or object, universal policy rules, and a universal way of expressing availability. These capabilities permit presence and availability servers in a myriad of differing distributed networks to exchange presence information in a meaningful way such that the ability to ascertain presence and availability is enhanced substantially compared to conventional systems. For example, the present invention extends presence concepts to the conventional telephone numbering (or E.164) system, enabling anyone with a phone number to control their own reachability without the rigid programming constraints of a conventional "find me/hide-me" presence and availability system.

Second, the present invention can use network nodes, such as communication devices, telephony switches, and servers, as agents for collecting presence information. The various context sensing agents collect a wide variety of presence, availability, and location information that can provide greater accuracy in presence and availability determinations compared to conventional systems. The present invention can employ both elaborate tracking rules and policy rules to further increase accuracy.

Third, the present invention can output a fractional probability, or multi-tiered likelihood classification, regarding a user's presence and availability at a specific address for a communication device/system. Conventional systems indicate simply whether the user is available or unavailable, with a small number of specialized tags and time online.

Fourth, the present invention can use learned or provisioned associations between communication devices to increase or decrease previously assigned availability probabilities. For example, a desk phone may have been assigned a low availability probability based on agent reports received from the context sensing agent in the desk phone. When the sensing agent in the co-located (desk) personal computer later sends an agent report indicating that the user is typing on the personal computer's keyboard, the low availability probability is increased even if the context sensing agent in the desk phone fails to provide different presence information different from than that used previously.

Fifth, the present invention can use classification tags to increase versatility, user configurability, sophistication, and accuracy compared to conventional systems. Classification tags can reflect a broad variety of additional information currently being ignored by presence and availability systems.

Sixth, the present invention can provide a way of mapping addresses associated with presence and availability systems to addresses in other, existing name spaces (or numbering systems) to enable "embedded presence" in inanimate objects as well. Potential uses for embedded presence include streamlined ordering and service systems that enable supplier or service provider identification and communication directly from object attributes without human intermediaries or manual lookup.

Seventh, the architecture of the present invention can use structured presence queries employing both standardized and proprietary query formats through an open, standardized transaction interface (such as HyperText Markup Language or HTML). Such open, standardized interfaces provide a basis upon which can be added several missing algorithms and mapping transformations needed to connect agents, presence servers, and name space mapping systems. Conventional systems fail to allow for such broad interconnectedness among systems that today are considered much more disparate or virtually nonexistent (with respect to the inter-networking). The present invention can provide powerful linkages to existing systems that work well in their respective spheres but can work even better when interconnected with related spheres. Such spheres are at best only sparsely connected today. The present invention can take advantage of the so-called "network effect" on a scale not previously possible.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Overview of the Network Architecture

Figure 1:
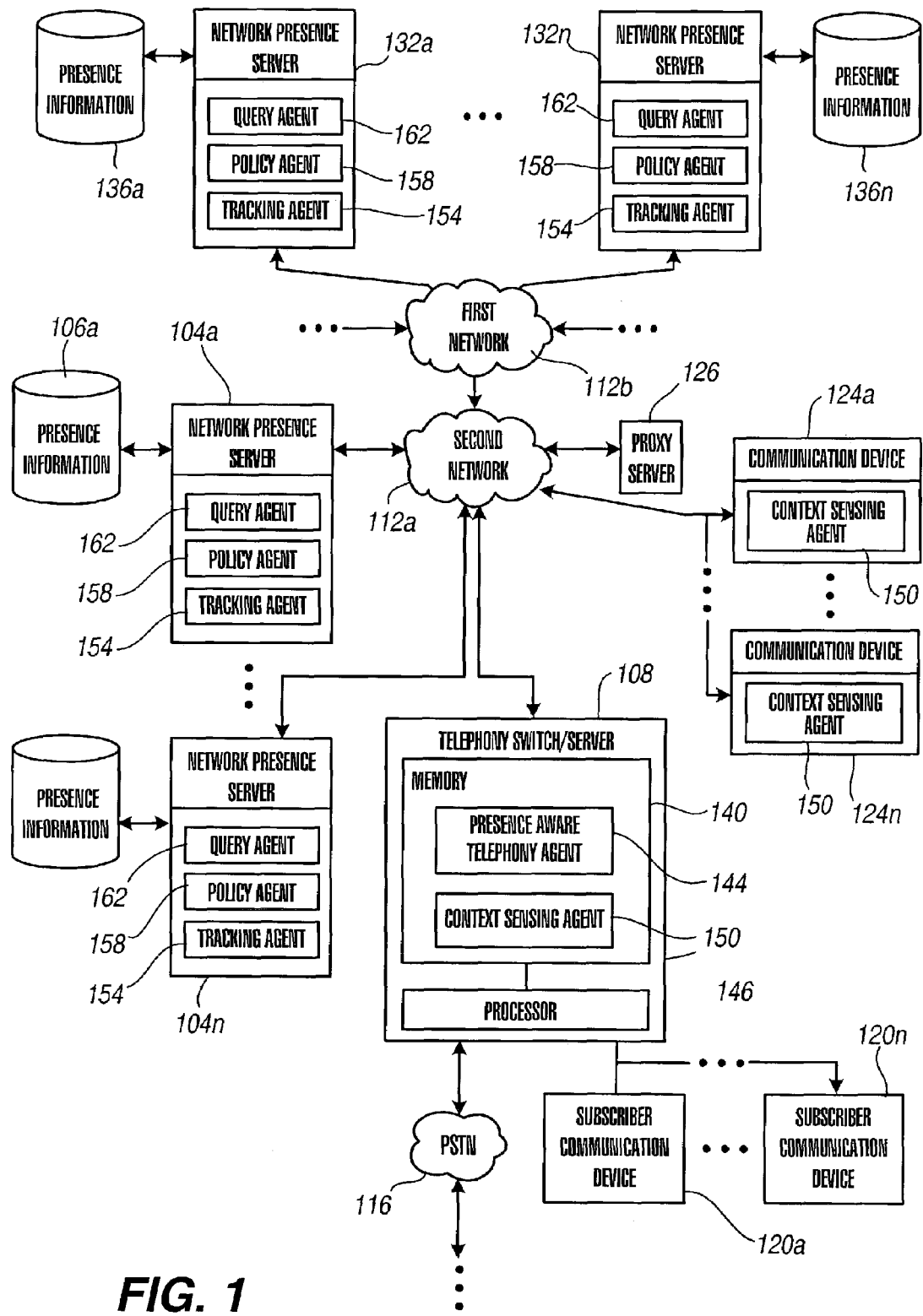
FIG. 1 is a block diagram of a presence and availability system according to an embodiment of the present invention.

FIG. 1 depicts a presence and availability system according to a first embodiment of the present invention. The presence and availability system 100 includes a telephony switch/server 108 for directing communications between and among first and second packet-switched networks 112a and b, the circuit-switched Public Switched Telephone Network or PSTN 116, a first plurality of (intelligent) communication devices 124a-n in communication with the network 112a, a proxy server 126 serving the devices 124a-n, a second plurality of (slave or limited intelligence) communication devices 120a-n in direct communication with the switch/server 108, a plurality of presence servers 104a-n and associated databases 106a-n containing first network presence information, and a plurality of presence servers 132a-n and associated databases 136a-n containing second network presence information. As will be appreciated, telephony switch/server 108, proxy server 126, and first and second presence servers 104 and 132 can be implemented in software and/or hardware, depending on the application.

The telephony switch/media server 108 can be any architecture for directing contacts to one or more communication devices. Illustratively, the switch/server 108 of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s DEFINITY™ or MULTI-VANTAGE™ private-branch exchange (PBX)-based ACD system. The switch or media server 108 typically is a stored program-controlled system that conventionally includes interfaces to external communication links, a communications switching fabric, service circuits (e.g., tone generators, announcement circuits, etc.), memory 140 (e.g., a computer or processor readable medium) for storing control programs and data, and a processor 146 (i.e., a computer) for executing the stored control programs to control the interfaces and the fabric and to provide automatic contact-distribution functionality. The switch/server 108 comprises a network interface card to provide services to the first plurality of communication devices 124a-n. Included in the memory 140 is a presence aware telephony agent 144 to interact with the presence server 132 when handling communications directed to a communication device. The Second presence server 104 is referenced by presence-aware telephony agent 144 on every initiated or terminated contact. Switch-server 108 can be decomposed into a feature server or call control server and a gateway (not shown) to provide signal control and conversion capabilities between the circuit-switched PSTN 116 or some other type of circuit-switched network and the packet-switched networks 112*a* and *b*.

The packet-switched networks 112*a* and *b* can be any data and/or distributed processing network, such as the Internet. The networks 112*a* and *b* typically include additional proxy servers (not shown), registrars (not shown), gateways (not shown), and routers (not shown) for managing packet flows.

The first and second plurality of communication devices 124*a-n* and 120*a-n*, respectively, can be any communication device suitable for the network to which they are connected. The first plurality of communication devices 124*a-n* are connected to the packet-switched network 112*a* and can include, for example, IP hardphones, IP softphones, Personal Digital Assistants or PDAs, Personal Computers or PCs, and laptops. The second plurality of communication devices 120*a-n* are commonly circuit-switched and can include, for example, wired and wireless telephones, PDAs, pagers, facsimile machines, and modems.

The switch/server 108 and first plurality of communication devices 124*a-n* (or host entities) each comprising one or more context sensing agent(s) 150, or state reporting agent(s), to provide agent reports containing predetermined types of raw location and availability information to the second presence server at selected time intervals and/or upon the occurrence of a predetermined event. Alternatively, the context sensing agent in the switch/server could be distributed among the switch/server and/or second plurality of communication devices. The raw location and availability information typically is indicative of a state or condition of the tracked identity. The contents of the agent report are discussed below in connection with FIGS. 2A and B. As will be appreciated, when the switch/server or communication device allows more than one user to log in (not concurrently) the context sensing agent represents the current user (or tracked identity) only. In that case, the host entity would have a flexible context sensing agent, which corresponds to a specific user (or tracked identity) for the duration of that login or a plurality of agents for each user if so configured.

The contents of the agent report can be user configurable. In this configuration, the raw location and availability information to be relayed is audibly presented (in audio form), visually displayed, or audiovisually displayed by the agent 150 to the user associated with the device (or owner of the identity being tracked). The agent 150 provides the user with an interface that allows changes to the raw location and availability information to be indicated. Alternatively, the current rule set or presence data from an associated presence server may be displayed and modified within more sophisticated devices. By way of example, the owner of the tracked identity can make changes to an availability state, rule set (policy or tracking correlation), etc. via a user interface when the agent presents the current tracked presence state or rule set(s) to the owner (prior to forwarding the agent report to the associated presence server or upon request to that presence server). The agent 150 thus allows direct manipulation of the raw location, availability, and rule set information by the user.

The first and second presence servers collect published presence information about a communication device and/or user thereof and store the collected information in their associated presence information databases. The presence servers provide the collected information to other network entities (which may include other presence servers) in response to queries. For example, because the first presence server serves a large geographic region with numerous LAN's of which the second network 112*a* is a part the second server may provide presence information to the first presence server as requested and/or at periodic intervals either by polling by the first server or push from the second server. Presence servers can interact not only with additional presence services (not shown) that continually collect and redistribute availability data from publishing sources as authorized by the user. The presence servers can collect information respecting the user's interaction with the various entities of FIG. 1 and/or other information provided directly or indirectly by the user when those entities publish their presence information to the presence server or modify that information by user request.

As will be appreciated, a user can have multiple communication devices, the presence and availability of which may be tracked by numerous separate presence servers. For example, the presence and availability of a cellular phone of a person may be tracked by the first presence server in a wireless network, the presence and availability of communication devices owned by the person's employer by the second presence server operated by the employer, and the presence and availability of communication devices owned personally by the person, such as a home phone and PC, by a third presence server. To provide a comprehensive picture of the presence and availability of the person, it is important that the first, second, and third presence servers communicate with one another or with a central presence server (such as a regional presence server) to exchange presence information collected by each of the first, second, and third presence servers. Information is not necessarily complete and it will be appreciated that the same rule sets for data exposure are applied to data flowing between servers (which typically use the same query formats as direct requests by a contactor).

Each of the presence servers 104 and 132 include a tracking agent 154, a policy agent 158, and a query agent 162.

Figure 2A:
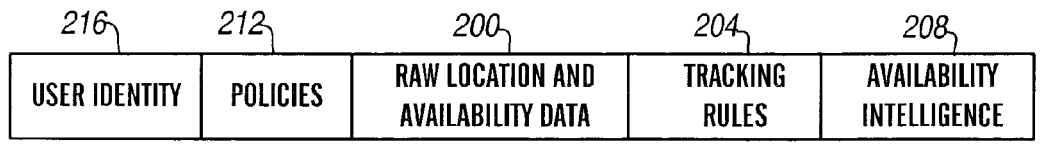
FIGS. 2A and B depict data structures that can be used in the presence information databases in the system of FIG. 1.

The tracking agent 1 (or registrar) 154 receives the various agent reports or raw location and availability information 200 (FIG. 2), filters the information according to predefined tracking rules 204 (FIG. 2), formats the filtered information, and correlates or maps the filtered information using the predetermined tracking rules 204 to form availability intelligence 208 (FIG. 2). Tracking rules 204 can be pre-provisioned by network administrators, configured by users, and/or learned or constructed by the tracking agent using correlation techniques or rules. Tracking rules are discussed in detail below with reference to FIGS. 2A and B. These rules can be configured in any desirable fashion, whether as correlation algorithms, learning algorithms, feedback algorithms, or otherwise as complex rules.

The policy agent 158, in response to queries for presence information associated with a specific user identity, authenticates that user identity if possible, retrieves the corresponding availability intelligence 208 for that identity, applies to or maps that data or intelligence against one or more policy rules 212 (FIG. 2). The policy agent uses the rules to modify (increase or decrease) the probability value (which is typically characterized by a numeric value between 0 and 1 or level in a plurality of levels) associated with a given contact address or modify associated tags and determine what, if any, presence information is to be provided to the contactor or requestor (i.e., how the contactor or requestor is to be treated) (based, for example, upon the identity of the requestor or degree of authentication, the time of day of the requested contact, or the type of communication desired with the user contactee (e.g., email, live voice, voice mail, instant messaging, SMS, video, and the like). The classification tags(discussed below) in the availability intelligence are used in this operation and some may be passed on in the result. Policy rules are discussed in detail below with reference to FIGS. 2A and B.

The query agent 162 receives, reformats, and forwards queries or requests for presence information (from contactors and other requesters) to the policy agent for processing and, when a response is received from the policy agent formats the filtered data (or frames) and forwards the formatted data to the requester. The query can be originated from another presence server or from presence aware telephony agent 144 in the switch/server or within an intelligent communication device seeking to contact the queried identity. The three basic types of queries are a request for pre-contact availability, contact arbitration, and subscription with notification (i.e., presence data pushed to the registrar). As will be appreciated, the query agent can periodically forward information to another presence server (such as the query agent of the first presence server to the second presence server), by subscription either on a temporal- or event-triggered basis (or upon request of the remote server at some predetermined interval). To provide interoperability between different presence servers, the query agents of the various presence servers preferably use a standardized format, such as a HyperText Markup Language (or HTML)-based or Extensible Markup Language (or XML)-based format.

The information databases held by a presence server are shown in FIGS. 2A and B. Each set of databases is associated with a user identity 216. As will be appreciated, the "identity of the user" refers to an identifier that identifies uniquely the user and authentication data for that user. Examples of user identities include the "address of record" in SIP, which is the general contact address published by the user. In one configuration, the address of record is the address points to presence server such as the first or second presence server rather than a specific communication device or system. The first or second presence server then collects presence information and provides an appropriate response to the requestor or contactor for the address or identity for which it is authoritative. As will be appreciated, a user may have more than one address or user identity, each representing a specific role for example.

Other data included in the databases for an identity include raw location and availability data 200, tracking rules 204, availability intelligence 208, and policies 212.

Figure 2B:
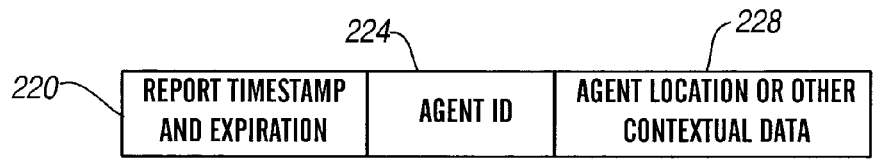

FIG. 2B shows the information contained in the raw location and availability data block 200. Referring to FIG. 2B, the raw location and availability information typically includes a timestamp associated with the sending of the corresponding agent report and (optional) expiration time 220 (after which the information is no longer valid), a unique agent identifier 224 associated with the corresponding switch/server or communication device (or the agent providing the corresponding report), and location or other contextual data 228 (which may include the reporting or host entity's contact (Internet Protocol or IP) address(es) and Media Access Control or MAC address(es) associated with each (IP) address), a (baseline) probability of contacting the tracked identity or user at each such address, default routing (or default router, gateway, and/or proxy server) for the associated (primary) network, the geographic or spatial location (if available such where as a cellular phone having a GPS location system or is in communication with an external wireless network location determining system), type of system, mode capabilities (voice, text, video, instant messaging, email, and the like), one or more contextual time stamps indicating the first and/or last human interaction received by the corresponding communication device (e.g., pressing a button on a keyboard or keypad) from the associated user (to indicate presence of the user), and various agent classification tags or indicators of the type of manual state change request(s) or commands originating from the user the communication device (e.g., typing on keyboard, initiating or engaged in a phone call (such as "on hook" or "off hook" for a telephone), turn off, checking voice mail, "busy", "out-to-lunch", and the like). The agent classification tags are generated automatically by the agent or manually by the user of the host entity.

The agent report includes the information formatted as shown in FIG. 2B. Additionally, the report includes an authentication token (if desired) to authenticate the agent in the communication device. The authentication token is typically not included in raw location and availability data 200 (FIG. 2A).

Although the address of the associated host device or sensing agent can be part of a well-known name space (like E.164 numbers or SIP addresses) it can also be from any other name or code space that uniquely identifies the associated entity in some way. Examples of other types of entity identifiers include a serial number of the host device in a private manufacturer's name space, the MAC address of the tracked identity or sensing agent, the telephone number or extension of the host entity in a private dialing name space, the IP address of the host entity or sensing agent, UPC code of an object, and Web or email address. The unique identity (e.g., contact address) of the sensing agent 150 is important to permit the tracking agent 154 to identify what agent 150 is the source of the agent report. Typically, a plurality of unique sensing agent identities (e.g., contact addresses) are associated with a single user identity (e.g., address of record).

Tracking rules 204 are provisioned, user configured, and/or developed by artificial intelligence such as based on pattern matching or event correlation techniques and provide rules governing how the raw location and availability information is to be processed into presence intelligence. Some tracking rules manipulate classification tags based on the raw location and availability information. The classification tag can be based on any suitable classification schema against which policy rule sets can be mapped. For example, the classification tag can communicate the purpose of the communication device (e.g., personal, home, business, office, etc.), the type of communication device (e.g., digital wired phone, analog wired phone, cellular phone wireless phone, Personal Digital Assistant or PDA, IP hard phone, IP softphone, pager, facsimile, email system, Web system, and the like), the spatial, functional, or geopolitical location of the communication device (e.g., latitude and longitude coordinates and other coordinates, home, automobile, office desk, nation, state, county, city, municipality, golf course, airport, store, and the like), the operating mode of the device (on/off or activated/deactivated), the event triggering the agent report (e.g., typing (on the keyboard), placing or initiating or conducting a contact, accessing voice mail or email, browsing on the Web, sending a message, activity timeout, or other user-directed event), the capabilities or media support of the reporting entity (e.g., packet-switched/circuit-switched, digital/analog, voice capable, instant messaging capable, video capable, audiovisual capable, synchronous or asynchronous communication, email capable, Web capable, and the like), protocols (e.g., H.323, SIP, proprietary, and the like), minimum usable priority, visibility class (i.e., what classes of requesters should see this data, and custom tag. The classification tags can be implemented by means of Extensible Markup Language or XML.

Other tracking rules 204 quantify or otherwise characterize the likelihood or probability (which is typically characterized by a numeric value from 0 to 1 or level of likelihood in a plurality of discrete levels) that the user is available at a given contact address, or increase or decrease a pre-assigned or pre-determined probability that the user is available at the given contact address based on correlation with the raw location and availability information received from another context sensing agent. Regarding the pre-assigned or predetermined probability, a first tracking rule may, based on information in the agent report from a first sensing agent, require that the availability probability for contacting the user at the contact address associated with the first sensing agent device or system be a first value. A second, different tracking rule may, based on availability intelligence received from a second (different) context sensing agent associated with another tracked identity, require by correlation that the availability at the first contact address be increased or decreased to a second different value. Alternatively, an agent report received from the first sensing agent may cause the availability probability for the contact address associated with the second (different) sensing agent to be increased or decreased, when the first contact address is known to be spatially associated with the contact address of the second sensing agent. Examples of such tracking rules include associations or correlations between an activity on one entity and availability on another entity such as an association between the spatial locations or functions of differing communication devices (such as the desk PC and desk phone are co-located such that if the desk PC is in use there is a high probability that the user is available on the desk phone, the user's cellular phone is turned off or has a weak signal when he is available at his desk phone, the wireless network serving the user indicates a spatial location for the cellular phone which has been recently used and that location is approximately the same as fixed locations for the user's desk PC and phone and therefore there is a high probability that the user may be reached by the PC or phone at lower cost then by cellular phone, if the probability for contact address X is less than the probability for contact address Y, use the probability for contact address Y for contact address X (due to the geographic proximity of the communication devices corresponding to the two contact addresses, etc.), queries to other presence servers to collect additional presence information that may be associated, correlated and merged with intelligence or data laready known (such as when the presence server serving the user's desk PC is distinct from that of the user's desk phone), etc.

As will be appreciated, tracking rules can become complex and algorithms for creating and applying the rules should be tunable by the user or administrator of the tracking agent. Preferably, artificial intelligence techniques are used by the agent to learn and recognize patterns (by pattern matching) and apply user feedback to those algorithms based on manual changes made to availability states by the owner of the tracked identity.

Availability intelligence 208, for each tracked user identity, can include a variety of information depending on the application but is stored in the same basic format as the raw location and availability data 200. For example, the intelligence includes contact address of a communication device or system associated with the user, context sensing agent identifier(s) (identifying the agent responsible for the associated intelligence server classification tags that denote a probability that the contact address will be able to provide a synchronous or asynchronous contact with the user, a particular media type, a particular priority, other server classification tags associated with the reporting entity, and context information in more detailed form). Server classification tags are generated by the server based on information in agent reports, including any agent classification tags.

As will be appreciated, server classification tags are generally more varied in number and scope and detailed in meaning than agent classification tags provided by the sensing agent. In other words, the set of possible server classification tags is typically larger than the set of agent classification tags. The sets may be disjoint or fully or partially overlapping, depending on the application. Typically, the set of agent classification tags is smaller than the set of server classification tags due to the limited intelligence and processing capabilities of many types of host entities. The server classification tags can be based on or be the same as the agent classification tags. Like the agent classification tags, the server classification tags can be user configurable.

Policy rules 212 generally stipulate how requestors are to be treated, such as what, if any, presence information is to be provided to a particular contactor (or requester or class or contactors or requesters) (based, for example, upon the identity of the requester, the time of day of the requested contact, or the type of communication desired with the user contactee (e.g., email, live voice, voice mail, instant messaging, video, SMS, and the like), the ability or reliability or identity authentication, and the like) and optionally may require further modification of the availability probability based on the availability intelligence. The policy rules can reference particular classification tags in modifying the probability or determining what presence information is to be provided to the contactor. Examples of policy rules include the following:

If the contactor is on a first list of identities, the contact is to be sent an unfiltered query response.

If the contactor is on a second (different) list of contacts and the contact is a voice contact, the contact is to be sent a response with only voice mail contact addresses.

If the contactor cannot be authenticated, remove this list (or class) of contact addresses from the query response.

If the contactor is within 100 feet of the contactee, add an entry as highest probability with the "in person" tag with specifics in the context details.

If the contactee is correlated geographically with a golf course, send only text-based contact addresses to normal requestors.

In one configuration, the tracking and policy rules are grouped into distinct and disjoint sets, with each set having a corresponding algorithm to apply the rule sets.

Operation of the Context Sensing Agent

Figure 3:
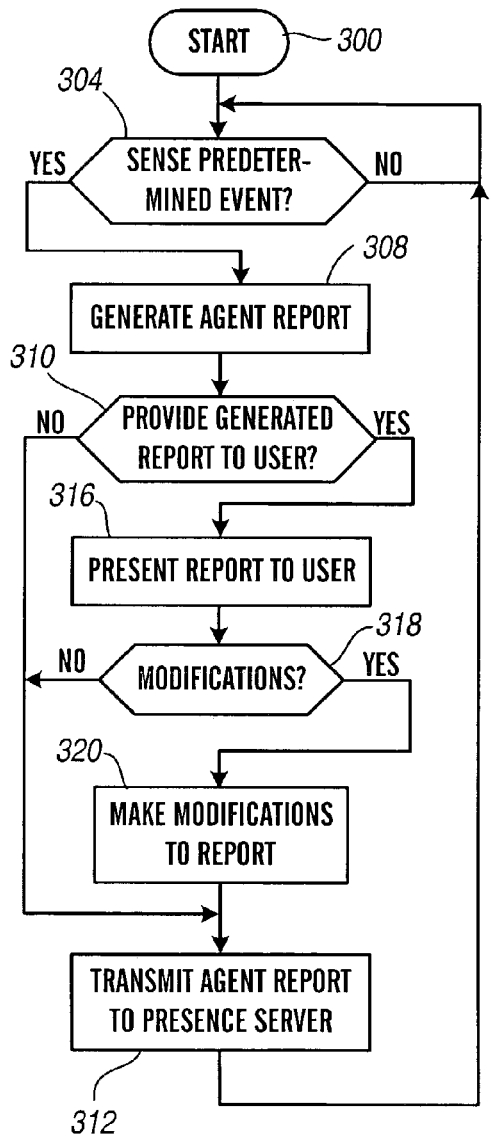
FIG. 3 is a flow chart depicting an operational embodiment of the context sensing agent of FIG. 1.

FIG. 3 illustrates the operation of the context sensing agent 150 according to an-embodiment of the present invention. In step 300, the agent is initialized. After initialization, the agent 150 monitors one or more operating parameters of the tracked identity for the occurrence of a predetermined event or trigger. Examples of predetermined events include receiving a command or request from the user such as a request to initiate a contact, a request to activate or deactivate the tracked identity, a request to terminate a contact (such as a call), a request for an agent report from a presence server, a user request to manipulate presence data, a time out, and the like. The monitored parameters are typically predefined by network administration and/or the user himself In decision diamond 304, the agent 150 determines whether or not one or more predetermined events have occurred. When one or more predetermined events have not occurred, the agent 150 continues the monitoring operation and repeats decision diamond 304 at a later time. When one or more predetermined events have occurred, the agent 150 proceeds to step 308.

In step 308, the agent generates an agent report addressed to a selected presence server, such as the Second presence server 104. In one configuration, the agent report is sent to an address of record associated with the person responsible for the event. The address of record is resolved to the selected presence server, by the Domain Name System or DNS or other resolution protocol.

In decision diamond 310, the agent determines whether or not the user of the host entity has elected to view outgoing agent reports prior to their transmission. If so, the agent, in step 316, presents the agent report or selected portions thereof to the user of the host entity for review and modification. This may also be effected by querying the user before report transmission to the presence server. If the user provides an appropriate response, he may then be asked to select the portion of the report to be edited. In any event, the selected portion of report is formatted and displayed, and the user makes appropriate changes, if any.

After a command is received to make the changes or after a timeout, the agent in step 318 determines whether or not the user has modified the report in any way. If so, the agent modifies the report according to the user's instructions in step 320.

If the user has not elected to review the agent report in decision diamond 310, if the user has made no changes to the displayed report in decision diamond 318, or after the agent has made any requested modifications to the displayed portions of the report in step 320, the report, modified to reflect any changes is sent to the presence server in step 312.

The agent then returns to monitoring the parameter(s) of the tracked identity in step 304.

Operation of the Tracking Agent within the Presence Server

Figure 4:
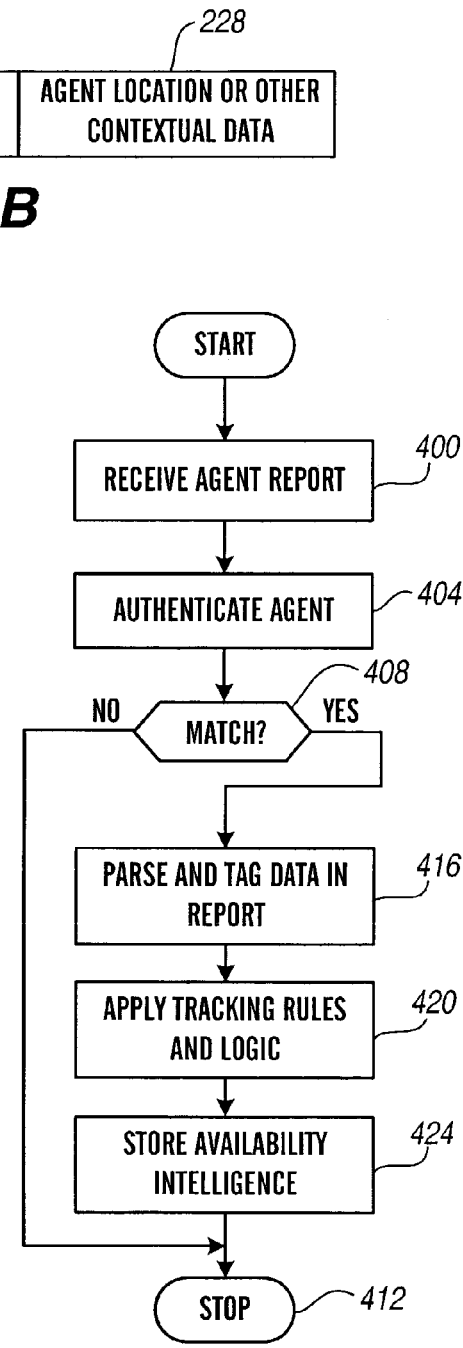
FIG. 4 is a flow chart depicting an operational embodiment of the tracking agent of FIG. 1.

FIG. 4 illustrates the operation of the tracking agent 154 according to an embodiment of the present invention.

In step 400, the tracking agent receives the context sensing agent report and in step 404 authenticates the agent report by known techniques. The authentication is to establish that the agent report is from a valid context sensing agent 150 identified in the report. Authentication is typically performed using the agent authentication token and/or unique agent identifier. Typically, authentication is performed by comparing the agent authentication token and/or unique agent identifier in the report with the corresponding agent authentication token and unique agent identifier in the associated presence server database. In decision diamond 408 where there is/are not identical match(es), the tracking agent proceeds to step 412 and does no further processing of the agent report. When there is/are identical match(es), the agent proceeds to step 416.

As an overview of steps 416 and 420, when authentication (and subsequent authorization) is/are successful the agent 154 examines the sensing agent identifier and based on the agent identifier processes the report and removes obsolete, prior reports from the reporting sensing agent. Processing involves application of tracking rules to reports to create current intelligence data (this step may be performed at receipt of report or alternatively at receipt of the presence query). All reports correspond to a provisioned user identity or address of record. Tracking rules and associated logic examine IP and/or MAC address(es) and/or gateway(s) listed in the agent report, seeking any corresponding entry in the database of previously processed (correlated) or provisioned presence information.

Turning now to step 416, the agent parses and, optionally, tags data in the report. The classification tags may be based not only on information in the report but also on a comparison of the report information with presence information in the corresponding record in the database. Typically, most, if not all, of the tagging of data is performed in step 420.

In step 420, the agent applies tracking rules and logic specific to the contact address or location. By way of example, when a rule matches the IP network range (in the report) for the network segment that services a user's desk phone, the associated MAC address (in the report) on the built-in ethernet card of the user's PC, the tracking agent 154 re-tags report information in step 416 and applies in step 420 a rule that states "if keyboard of PC was last used within five minutes, update status on office phone reachability to available and present if the phone is not in use or unavailable." This is valid because the PC and desk phone are in close spatial proximity to one another. In this manner, the desk phone can show valid presence information even when it does not have its own context sensing agent.

Although not shown in FIG. 4, steps 416 and 424 are performed iteratively or recursively until the entire contents of the report are parsed, tagged, and mapped against tracking rules.

In step 424, the availability intelligence outputted by steps 416 and 420 is stored as presence information in the associated database.

Operation of the Query Agent

Figure 6:
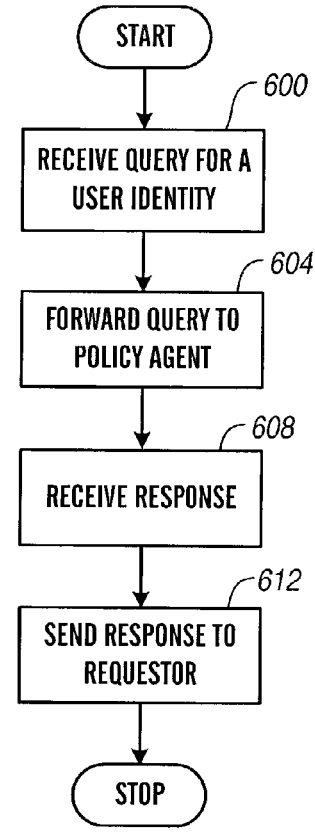
FIG. 6 is a flow chart depicting an operational embodiment of the query agent of FIG. 1.

FIG. 6 illustrates the operation of the query agent 162 according to an embodiment of the present invention. The query agent 162 in step 600 receives, from a requester, a query for presence information for a specified user identity. As noted previously, the requester can be a communication device, telephony agent, or another presence server. The query typically includes the user identity being queried, the identity (or address) of the source of the query, typically the identity of a person seeking to contact the identified user (including any special tags), identification of the requested information, authentication information or tokens, and a time stamp.

In step 604, the query agent reformats and forwards the query to the policy agent 158 for processing. The processing of the reformatted query by the policy agent 158 is discussed below.

In step 608, the query agent receives a response from the policy agent and, in step 612, formats the received information and forwards the formatted information to the requestor.

The response from the query agent is received by a device, such as a communication device or presence server, associated with the requestor. The classification tags in the response can be used, along with other information in the response, to provide the requester with a series of options. For example, the displayed options could indicate that the user contactee is typing on the computer and is not on his nearby desk phone, provide a listing of the media capabilities of the computer and the nearby desk phone, indicate that the user may be most available by his desk phone (for a live voice communication) or by his computer (for e-mail), and that the user's pager and cellular phone is turned off. Other available communication options or modes (other than live voice communication), such as voice mail, instant messaging, video, SMS, and the like can be presented as well along with an associated likelihood or probability of the second communication option being available. Additional information provided to the requestor could include the monetary cost to the requestor or user associated with each listed mode of contact, minimum priority for contact (i.e., emergency contacts only or any, etc.), authentication token or authentication level required, and associated services.

Operation of the Policy Agent

Figure 5:
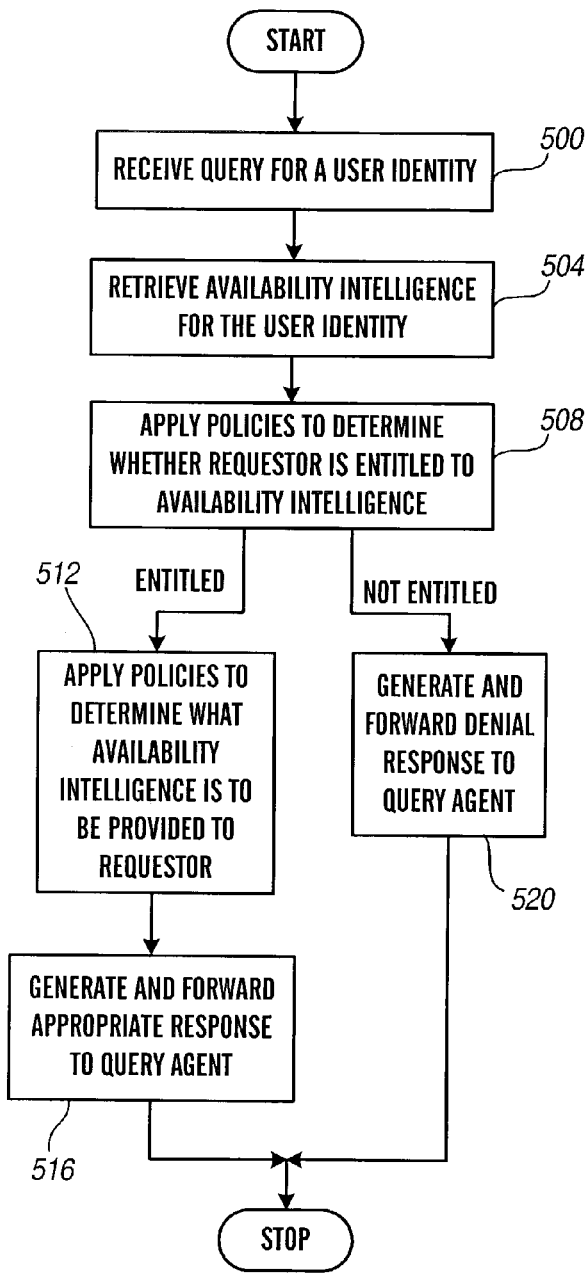
FIG. 5 is a flow chart depicting an operational embodiment of the policy agent of FIG. 1.

FIG. 5 illustrates the operation of the policy agent 158 according to an embodiment of the present invention.

In step 500, the policy agent 158 receives, from the query agent, the query for the identified user and, when possible, authenticates the query originator's identity by known techniques (such as public/private key-based systems, caller ID/ANI or other network-based authentication methods) to confirm that the requestor is who they say they are. Bill collectors, telemarketers and other would-be contactors may attempt to mislead the policy agent as to whom they are to receive desired presence information to which they would not otherwise be entitled.

When the authentication is successfully performed, the policy agent 158 in step 504 retrieves the availability intelligence 208 and policy rules 212 for the identified user.

In step 508, the policy agent 158 matches or maps the authenticated request against the policy rules for the queried identity (or identity referenced as the requester in the query) to determine any limits to disclosure of presence information to the given queried identity. As noted, certain classes of requestors may not be entitled to receive any presence information or only predetermined types of presence information, possibly including misleading or inaccurate information, while other classes of requesters may be entitled to receive without restriction the presence information responsive to the request. For example, the requester can be provided or not provided with a preselected contact address and/or be provided with an inaccurate, altered, or modified availability probability for one or more contact addresses. The availability intelligence to be provided in any given situation depends on what information is to be provided for the specific contactor or how the contactor is to be treated.

The policy rules can be configured so as to utilize server classification tags in performing step 508 in a computationally efficient manner. In other words, the policy rules can reference one or more server classification tags in determining what availability intelligence and other presence information is to be provided to a requestor/contactor. For example, a user can stipulate as a policy rule that his or her mobile phone number is not to be provided to business contactor after 6 pm and before 7 am. A server classification tag indicates that the contact address for the mobile phone corresponds to a mobile phone. The policy rule effecting the user's stipulation references this tag. When a query arrives from a fellow employee or customer of the user after 6 pm and before 7 am, the policy agent locates the rule, searches for the tag, and refuses to provide the contact address of the mobile phone.

When the requestor is entitled to receive presence information with or without restriction, the policy agent 158 in step 512 applies or maps policies against the requester identity to determine what availability intelligence is to be provided to the requestor. Typically, the policy agent 158 filters the availability intelligence based on the policy rules matching the queried identity.

In step 516, the policy agent 158 generates and forwards in step 516 to the query agent a response to the query agent 162 containing the filtered data.

When the requester is not entitled to receive any presence information with or without restriction, the policy agent 158 in step 520 generates and forwards to the query agent a denial response. The response typically contains no presence information.

Figure 7:
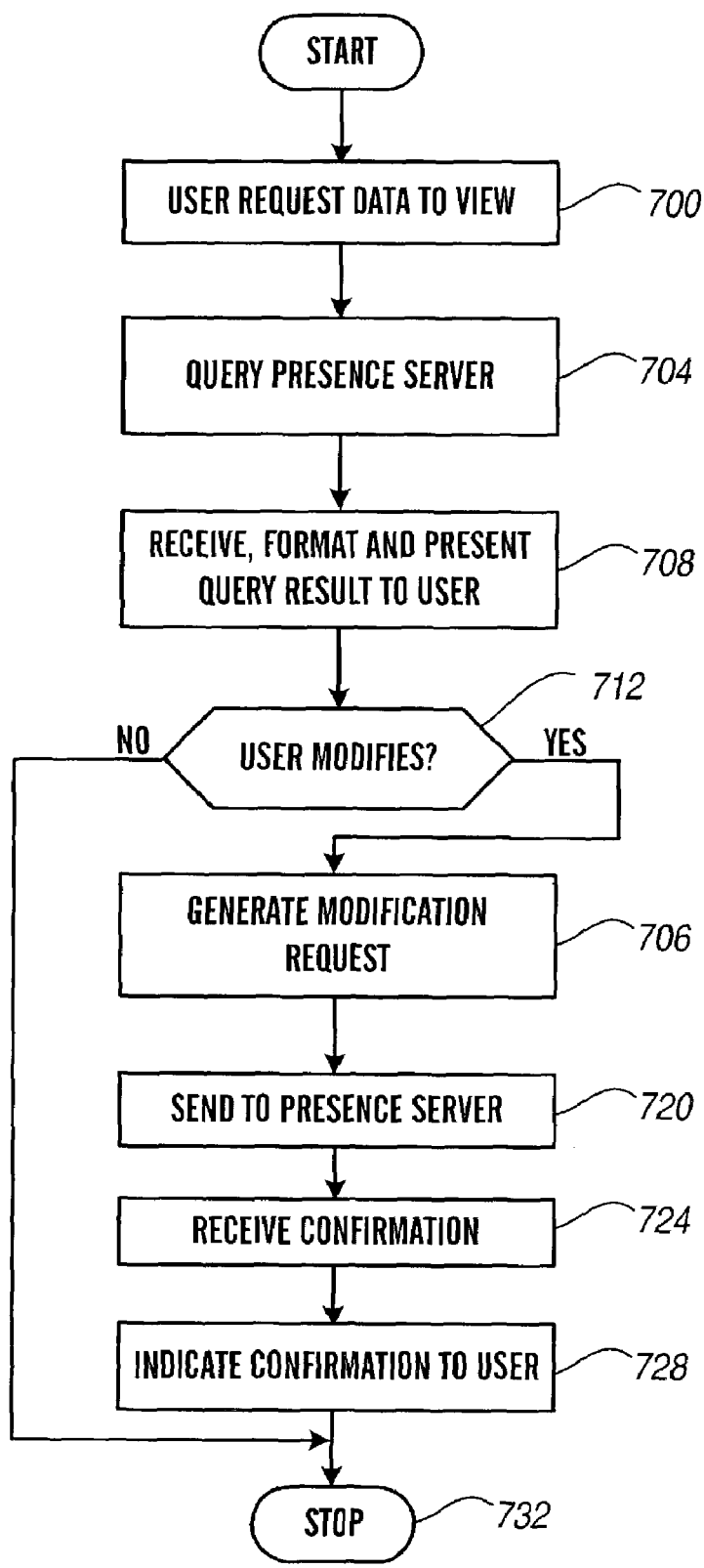
FIG. 7 is a flow chart depicting an operational embodiment of a user interface for modifying agent reports, policy rules, and/or tracking rules.

User Interface for Modifying Agent Reports, Availability Intelligence, Raw Location and Availability Data, Tracking Rules, and/or Policy Rules FIG. 7 depicts a process for modifying current availability intelligence or reconfiguring tracking and/or policy rules.

In step 700, the user from a communication device requests the context sensing agent to view specified data or information (which may be one or more of raw location and availability data or a portion thereof, current availability intelligence or a portion thereof associated with the user, and/or tracking and/or policy rules associated with the user).

In step 704, the context sensing agent queries an associated presence server for the information.

In step 708, the context sensing agent formats and presents the query results, when received from the presence server, to the user.

In decision diamond 712, the agent determines whether the user has modified the displayed information. This step is performed in response to receipt of a command from the user or if no command is received after a selected time out period has expired. When the displayed information has not been changed, the agent proceeds to step 732 and terminates operation. When the information has been changed, the agent proceeds to step 716.

In step 716, the agent generates a modification request to the presence server. In step 720, the modification request is sent to the presence server.

In step 724, the presence server sends an appropriate confirmation to the sensing agent.

In step 728, the sensing agent provides the user with an appropriate confirmation that the requested changes have been effected. The agent can then forward the user a request whether there is additional information to be changed. If so, the above steps are repeated.

The sensing agent then terminates operation in step 732.

Name Space Mapping and Embedded Presence Tokens

In another embodiment of the present invention, a means of leveraging presence systems by mapping addresses between existing numbering and naming schemes (name spaces) to enable wider correlation of contact addresses across communications systems or embedded presence in documents, products, and other inanimate objects is provided. Algorithms are provided for transformation of an address from its origin name space (such as E.164 or SIP) to a URL pointer to one or more addresses in the same or another name space, which may include pointer(s) to a presence server(s). Stated another way, the methodology of this embodiment permits a universal transformation from a first address in a first name space to a second address in the same or another name space, with each of the first and second addresses being associated with a common person or entity or service or function. To provide universal application, the acquisition of addresses from a directory service is performed using a standardized query/response format, such as that used for the Domain Name Service (or DNS) or Lightweight Directory Access Protocol (or LDAP). Potential uses for embedded presence include streamlined ordering and service systems that enable supplier or service provider identification and communication indirectly from the properties of an inanimate object without human intermediaries or manual lookup.

In one configuration, this embodiment is implemented by embedding or including in a name space associated with an inanimate object a tag or presence token that is further associated in a directory service or presence server with an identity of a person or entity. The inanimate object can be any object that is associated with a service, sale, or other marketing activity, such as a car (automotive service), magazine (subscription), consumable article (sale), and the like.

The name space can be of any suitable form, whether numeric, alphabetical, or alphanumeric, that may or may not uniquely identify the particular object. Examples include a Universal Product Code or UPC, an International Standard Book Number or ISBN code, part number, MAC address, IP address, a serial number, an IP address, a Session Initiation Protocol address, an email address, a Web address, a URI, a URL, an E.164 number, and a telephone number, etc.

The embedded tag can be of any suitable form, whether printed or shared wirelessly. Examples of tags that may be employed include a code, a telephone number or other identifier printed on the object or Radio Frequency Identifier or RFID wireless tags.

In an operational example, the tag is scanned electrically, magnetically, optically, or magneto-optically, and is thereby captured by a communications device, such as a PC, PDA, cellular phone, laptop, and the like. The device can then look up the address within its associated name space in order to contact a presence server or other type of look up or transformation service. The recipient server locates the entry corresponding to the address in that name space and provides a response that can include not only contact information like the telephone number and the address of the manufacturer, retailer, or service provider but also operational options available to the requester for acquiring further information, such as requesting servicing of the object, purchasing additional features for the object, purchasing additional objects, subscribing to the object (in the case of a magazine), acquiring more information about operation(s) or function(s), of the object or warranty coverage of the object, a Web Site associated with a manufacturer or supplier of the object, status of a service associated with the object (e.g., the object is a shipping slip from Federal Express™ or United Parcel Service™ and the status is the status of the shipment associated with the slip), origin of object, and the like. The various options can be presented to the requestor by the communications device through known techniques, such as by audio, video, and audio-visual techniques.

The address received in the response from the presence server or domain name service or other mapping service can also be the address of a second presence server associated with the manufacturer, retailer, or service provider. When the query agent at the second presence server is contacted, the requester would be provided with communication options and an associated probability for each option as discussed previously. The requester could then select among the various options depending on his needs.

A number of variations and modifications of the invention can be used. It would be possible to provide for some features of the invention without providing others.

For example in one alternative embodiment, the various agents referred to herein can be implemented as software, hardware or as a combination thereof. Accordingly, the agents can be implemented as a logic circuit such as Application Specific Integrated Circuit or ASIC.

In yet another embodiment, the present invention may be implemented in a "push" as opposed to or in addition to a "pull" configuration. For example, the network presence server may be configurable to accept, process, and fulfill subscription(s) to presence information. By way of illustration, the query agent may accept subscription requests; the policy agent may authorize and allow or disallow a subscription request based on predefined policy rules or explicit user approval (whether mandatory or optional); and the query agent may fulfill subscription requests upon predefined events (with notification being provided to the query agent) or predefined intervals. As will be appreciated, "subscriber fulfillment" uses the identical process of external query fulfillment, the only difference being that the request originates in the presence information server or a module thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for ascertaining availability of a person having an associated address within a name space, comprising:
   (a) receiving a first agent report from a first context sensing agent, the first context sensing agent being in a first communication endpoint associated with a person and the first agent report comprising at least one first classification tag descriptive of a first event involving the first communication endpoint, wherein the at least one first classification tag is indicative of an availability of the person to be currently contactable at the first communication endpoint;

(b) based on the at least one first classification tag, determining a probability value of the person being at least one of available and unavailable at the first communication endpoint; and (c) receiving a second agent report from a second context sensing agent in a second communication endpoint other than the first communication endpoint, the second agent report comprising at least one second classification tag descriptive of a second event involving the first communication endpoint and indicative of an availability of the person to be currently contactable at the first communication endpoint, the first and second events being different, wherein the first and second agent reports each comprises a unique identifier associated with at least one of the corresponding context sensing agent and corresponding communication endpoint, at least one address associated with the first communication endpoint, and at least one time stamp associated with a corresponding one of the first and second events.

2. The method of claim 1, wherein the person is deemed to be available when the person is physically located near the first communication endpoint and to be unavailable when the person is not physically located near the first communication endpoint, wherein each of the first and second agent reports further comprises an authentication token, wherein the at least one address is at least one of an Internet Protocol or IP address of the communication endpoint and a Media Access Control address, wherein each of the at least one first and second classification tags is an agent classification tag, and wherein step (b) comprises the substeps:

(B1) analyzing each of the at least one first and second agent classification tags; and (B2) associating a server classification tag with at least one of the person, the associated address, and the name space based on the analysis of the at least one first and second agent classification tags.

3. The method of claim 1, wherein the person is deemed to be available when the person is physically located near the first communication endpoint and to be unavailable when the person is not physically located near the first communication endpoint, wherein each of the first and second classification tags is expressed in a markup language, wherein each of the first and second agent reports further comprises information regarding at least one of a spatial location, a geopolitical location, and functional location of the first communication endpoint, and wherein the first communication endpoint is at least one of an Internet Protocol or IP hardphone, IP softphone, Personal Digital Assistant or PDA, wired telephone, wireless telephone, pager, facsimile machine, telephony switch, server, and modem.

4. The method of claim 1, wherein the receiving step comprises:

presenting at least one of (a) at least some of the contents of the first agent report and (b) at least some current availability intelligence to the person for configuration before the receiving step.

5. The method of claim 1, wherein the determining step comprises the substep of mapping tracking rules associated with a user identity of the person against the first and second classification tags to provide availability intelligence, wherein the user identity is unique, and wherein the mapping substep comprises the further substep of comparing a second user identity associated with a requestor of availability intelligence of the person against a listing of user identities to determine what availability intelligence is to be provided to the requestor; and (d) generating at least one server classification tag based at least in part on the first and second agent reports and wherein the tracking rule mapping substep comprises comparing the at least one server classification tag against a set of classification tag set forth in one or more policy rules.

6. The method of claim 1, wherein the person is deemed to be available when the person is physically located near the first communication endpoint and to be unavailable when the person is not physically located near the first communication endpoint, wherein each of the at least one first and second classification tags is a plurality of tags and the plurality of tags are indicative of a plurality of the following: the purpose of the first communication endpoint, the type of first communication endpoint, the geopolitical location of the first communication endpoint, the functional location of the first communication endpoint, the spatial location of the first communication endpoint, the operating mode of the first communication endpoint, the event triggering the agent report, the capabilities of the first communication endpoint, media type of the first communication endpoint, minimum acceptable contact priority, and a user customized tag.

7. The method of claim 1, wherein the person is deemed to be available when the person is physically located near the first communication endpoint and to be unavailable when the person is not physically located near the first communication endpoint and further comprising:

at least one of increasing and decreasing the probability rating based on the at least one second classification tag, wherein the second communication endpoint is in close spatial proximity to the first communication endpoint.

8. A method for determining an availability of a person, object, or other entity comprising:

(a) receiving a first agent report from a first context sensing agent in a first communication endpoint associated with a first user, the first agent report comprising first presence information;

(b) generating at least one server classification tag based at least in part on the first agent report, wherein the at least one server classification tag indicates a plurality of a purpose of the first communication endpoint, a type of the first communication endpoint, a location of the first communication endpoint, and an operating mode of the first communication endpoint;

(c) determining a first probability value that the first user is contactable through the first-communication endpoint, said determining step comprising the substep of:

(C1) applying tracking rules associated with a contact address, set forth in the first agent report, to the first presence information to provide first availability intelligence, (d) thereafter receiving a second agent report from a second context sensing agent in a second communication endpoint associated with the first user, the second agent report comprising second presence information;

(e) changing the first probability value to a second value based on at least some of the second presence information;

(f) updating the first availability intelligence to provide second availability intelligence reflecting the second value;

(g) receiving a request from a requestor for availability intelligence associated with the first user; and (h) mapping the at least one server classification tag against a set of classification tags set forth in one or more policy rules, to determine what availability intelligence is to be provided to the requestor.

9. The method of claim 8, wherein the first and second communication endpoints are each at least one of an Internet Protocol or IP hardphone, IP softphone, Personal Digital Assistant or PDA, wired telephone, wireless telephone, pager, facsimile machine, telephony switch, server, messaging system, and modem, wherein the first communication endpoint is in spatial proximity to the second communication endpoint and the first user is one or more of a person, a group of persons, a computational component, a collection of computational components, a service provider, a group of service providers, a product provider, and a group of product providers and further comprising:

parsing and first presence information in the first agent report; and tagging at least some of the parsed first presence information with at least one classification tag.

10. A computer readable memory encoded with processor executable instructions for performing the steps of claim 8.

11. The method of claim 8, wherein the first context sensing agent is operable (i) to present at least one of (a) at least some proposed contents of the first agent report and (b) at least some current availability intelligence to the first user for configuration and (ii) to forward the first agent report to a presence server.

12. The method of claim 11, wherein the availability intelligence comprises a plurality of the following: contact address of the communication endpoint, a context sensing agent identifier, one or more classification tags, one or more time stamps associated with an agent report, one or more time stamps associated with the one or more classification tags, a probability of contacting the person at a contact address, default router and/or proxy address for an associated network, a geographical location, a geopolitical location, a functional location, a spatial location, type of a communication endpoint associated with the context sensing agent, and communication mode capabilities of the communication endpoint.

13. The method of claim 8, wherein the first and second presence information comprise a plurality of tags and the plurality of tags are indicative of a plurality of the following: the purpose of the first or second communication endpoint, as appropriate, the type of first or second communication endpoint, as appropriate, the spatial location of the first or second communication endpoint, as appropriate, the geopolitical location of the first or second communication endpoint, as appropriate, the functional location of the first or second communication endpoint, as appropriate, the operating mode of the first or second communication endpoint, as appropriate, the event triggering the respective agent report, the capabilities of the first or second communication endpoint, as appropriate, a media type of the first or second communication endpoint, as appropriate, minimum acceptable contact priority, and a user customized tag and wherein the availability intelligence comprises a plurality of an address of the first communication endpoint, a context sensing agent identifier, and the updated probability.

14. The method of claim 8, wherein the policy rules control at least one of how a requestor of presence information is to be treated and availability probability is to be modified specifically for requestor.

15. The method of claim 8, wherein the second presence information is associated with a second probability value different from the first probability value and the adjustment to the first probability value is determined from the first and second probability values.

* * * * *